May 27, 1952  W. S. PRAEG  2,598,431
MACHINE FOR FINISHING GEARS WITH DIAGONAL TRAVERSE
Filed April 18, 1947
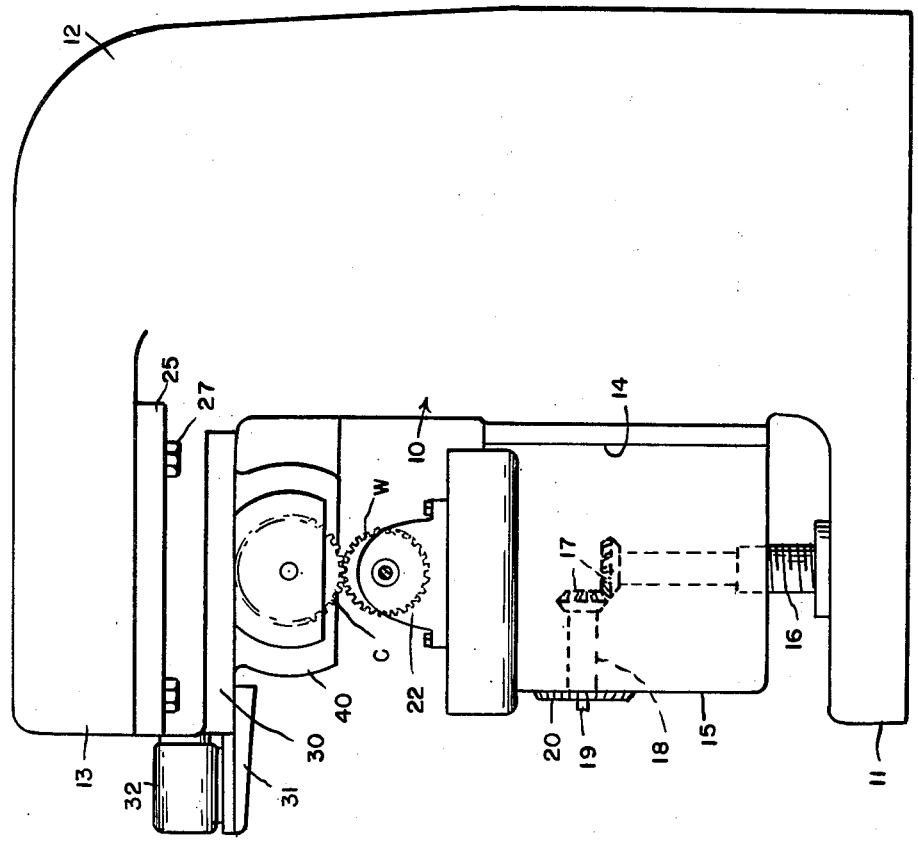
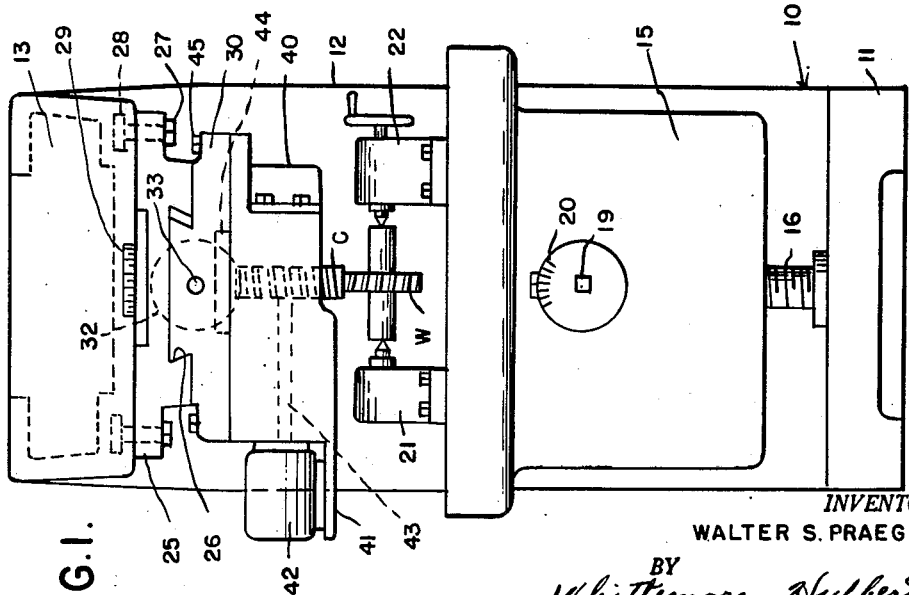
INVENTOR.
WALTER S. PRAEG
BY
Whittemore, Hulbert
& Belknap
ATTORNEYS Patented May 27, 1952

2,598,431

UNITED STATES PATENT OFFICE 2,598,431

MACHINE FOR FINISHING GEARS WITH DIAGONAL TRAVERSE

Walter S. Praeg, Detroit, Mich., assignor to National Broach & Machine Company, Detroit, Mich., a corporation of Michigan Application April 18, 1947, Serial No. 742,434

4 Claims. (Cl. 90—1.6)

The present invention relates to a machine for finishing gears with diagonal traverse.

It is an object of the present invention to provide a machine effective to cause a gear and gear-like cutter to roll in mesh while at the same time to partake of a relative traverse in a direction which occupies a plane parallel to the axes of both gear and cutter, which direction is oblique to the axes of both said gear and cutter and wherein the axes of the gear and cutter are inclined with respect to each other.

It is a further object of the present invention to provide a simple, rugged machine adapted to carry out a gear shaving operation with the gear and gear-like cutter meshed at crossed axes and in which the direction of relative traverse between the gear and cutter may be varied between wide limits.

Other objects and features of the invention will become apparent as the description proceeds, especially when considered in conjunction with the accompanying drawings, wherein:

Figure 1 is a front elevation of a machine constructed in accordance with the present invention; and Figure 2 is a side elevation of the machine shown in Figure 1.

Referring now to the drawings, the machine comprises a frame 10 having a knee 11, a column 12 and a forwardly projecting arm 13. Ways are provided on the forward face of the column, as indicated generally at 14, and vertically adjustable in these ways is a table 15. Means are provided for effecting vertical adjustment of the table 15 and include a feed screw 16 driven through beveled gears 17 from a shaft 18 terminating in a tool-engaging portion 19. A vernier scale is indicated at 20 for setting the table 15 to various heights.

Mounted at the top of the table 15 is a tailstock 21 and a headstock 22 which are adapted to support a work gear W therebetween. The work gear is mounted between the headstock and tailstock for free rotation.

Secured to the underside of the forwardly extending overhanging arm 13 is an adjustable member 25 having ways 26 formed in its lower side. The member 25 is mounted for adjustment about a vertical axis with respect to the arm 13 and is adapted to be clamped in position by bolts 27, the heads of which extend into a circular T-slot indicated at 28. A vernier scale is shown at 29 by means of which the member 25 may be set to precisely predetermined position.

Slidable in the ways 26 is a tool slide 30 having a motor supporting bracket 31 rigidly secured thereto carrying a motor 32 operatively connected to a feed screw 33 by means of which the tool slide 30 may be reciprocated longitudinally of the ways 26. It will be understood that a suitable feed nut (not shown) is carried by the member 25 so that rotation of the feed screw 33 effects translation of the slide 30 longitudinally of the ways.

An adjustable tool support 40 is carried by the tool slide 30 and is adjustable relative thereto about a vertical axis which, with the slide 30 in intermediate position, coincides with the axis of adjustment of the member 25. The tool support 40 is piloted for adjustment about the vertical axis by a pilot 44 and is adapted to be clamped in adjusted position by bolts 45 which extend into T-slots similar to the T-slots 28 previously described. A bracket 41 is carried by the tool support 40, which in turn carries a motor 42 having operative connections to a cutter spindle 43. The cutter spindle 43 carries the gear-like shaving cutter C.

It will be noted that the work is supported between head and tailstocks 22 and 21 which are mounted on the table 15 and that the table 15 is vertically adjustable. No other adjustments are provided for the work W, the other necessary relative adjustments between the work and cutter and the work and the ways 26 being provided in the head.

The setting of the machine illustrated in the figures was selected to provide for the clearest presentation of the structure and does not represent an operative setting. In practice, the axes of the work piece W and the cutter C, which are illustrated in the figures as parallel, are set at an angle with respect to each other, this angle being between 2° and 20°. The ways 26, which are illustrated in the figures as extending perpendicular to the axes of the gear and cutter, are in practice inclined at a substantial angle to both axes, this angle preferably being not less than 5° with respect to the axes of either gear and cutter and also substantially less than 90° with respect to either the axis of the gear or cutter.

In order to effect a desired setting of the machine, the direction of relative reciprocation between the work piece W and the cutter C is selected, clamping bolts 27 are loosened and by employing the scale 29 the member 25 is rotated about a vertical axis until the ways 26 extend at the desired angle with respect to the axis of the cutter. This initial adjustment will of course move the cutter support 40, inasmuch as at this time the axis of the cutter C remains perpendicular to the direction of the ways 26. After the desired adjustment has been made and the bolts 27 have been tightened to clamp the member 25 in adjusted position, bolts 45 are loosened and the cutter or tool support 40 is adjusted about the vertical axis of the pilot 44 until the axis of the cutter is in desired crossed axes relationship with the axis of the work piece W. A vernier scale similar to that shown at 29 is provided so that exact settings of the cutter support 40 may be made.

After shaving a gear on work piece W it is normally checked in accurate instruments to determine if the correct lead has been machined thereon, and if slight errors appear, a corresponding slight adjustment of the cutter support 40 may be made. For this purpose a vernier scale or an arrangement effective to measure angular adjustment of the cutter support by means of a micrometer are preferably provided.

The operation carried out by the present machine is known as diagonal traverse, and it is found that a very heavy cut may be taken in a single pass particularly where the single pass is followed up with a return pass without adjustment of the machine. The second pass normally results in the removal of a few ten thousandths of material which remained on the gear teeth during the first pass as a result of the spring and resilience of the machine. Accordingly, it is not essential that means be provided for effecting automatic up-feed of the work. On the other hand, if such up-feed is desired it may be made by means of a suitable tool engaging the portion 19 of the shaft 18.

The present machine is particularly useful since all adjustments between the axes of the gear and tool and between the direction of reciprocation and the axes of the gear and tool are made by adjusting parts carried by the forwardly projecting head or arm 13 of the machine. Thus the work piece itself is not adjusted, which is particularly desirable in many cases where the gear to be machined is formed on a long shaft, and hence adjustment of the work supporting members would be limited.

While reference has been made to the fact that the machine illustrated is not provided with means for automatically feeding the work piece up toward the cutter at the end of the stroke, such means, if desired, may be employed and apparatus for this purpose is illustrated in Drummond Patent 2,270,422.

While there is illustrated and described a single preferred embodiment of gear shaving machine, it will be appreciated that the full illustration and complete description has been given merely to enable those skilled in the art to practice the invention, the true scope of which is indicated by the appended claims.

What I claim as my invention is:

1. A gear finishing machine comprising a frame, a first member, means mounting said first member for angular adjustment on said frame about a first axis, means on said frame to clamp said member rigidly in any position of angular adjustment, a second member, rectilinear ways connecting said first and second member to provide for rectilinear traverse of said member relative to said first member, feed screw and nut means extending between said members, a motor means carried by one of said members operably connected to said feed screw and nut means to traverse said second member along said ways, a third member, means mounting said third member to said second member for angular adjustment about a second axis parallel to said first axis, means between said second and third members for clamping said third member in any position of angular adjustment, a rotary support on said third member having its axis perpendicular to said first named axis, motor means mounted on said third member for driving said rotary support, a second rotary support on said frame having its axis perpendicular to the axes of angular adjustment of said first and third members, and means for adjusting the normal spacing between the axes of said rotary supports.

2. A machine as defined in claim 1 in which said last mentioned means comprises a slide on which said second rotary support is mounted, and ways between said frame and said slide parallel to the axes of adjustment of said first and third members along which said slide is adjustable.

3. A gear finishing machine comprising a frame, a table mounted on said frame for vertical adjustment, a first rotary support on said table, said frame having a portion overhanging said table, a first member carried at the underside of said overhanging portion and mounted for adjustment about a vertical axis, rectilinear horizontal ways at the underside of said member, a second member carried at the underside of said first member and horizontally slidable relative thereto along said ways, a third member carried at the underside of said second member and mounted for adjustment relative thereto about a vertical axis, a second rotary support on said third member in position overlying said first rotary support, and motor means for effecting rotation of said second rotary support and horizontal reciprocation of said second and third members and second rotary support, said motor means comprising a first motor mounted on said second member and feed screw mechanism connecting said first and second members, and a second motor mounted on said third member and connected to said second rotary support.

4. A machine as defined in claim 3 in which said first rotary support is a work support for mounting a work gear, and said second rotary support is a tool support for mounting a gear-like finishing tool in mesh with said work gear.

WALTER S. PRAEG.

REFERENCES CITED

The following references are of record in the file of this patent:

UNITED STATES PATENTS

| Number | Name | Date |
|---|---|---|
| 2,280,045 | Miller | Apr. 14, 1942 |
| 2,347,997 | Drummond | May 2, 1944 |

FOREIGN PATENTS

| Number | Country | Date |
|---|---|---|
| 480,247 | Great Britain | Feb. 14, 1938 |